Jan. 23, 1968
D. MANCY ET AL
3,365,362
ANTIBIOTIC FOR TREATING TUBERCULOSIS
AND METHOD OF PRODUCING SAME
Filed June 6, 1962
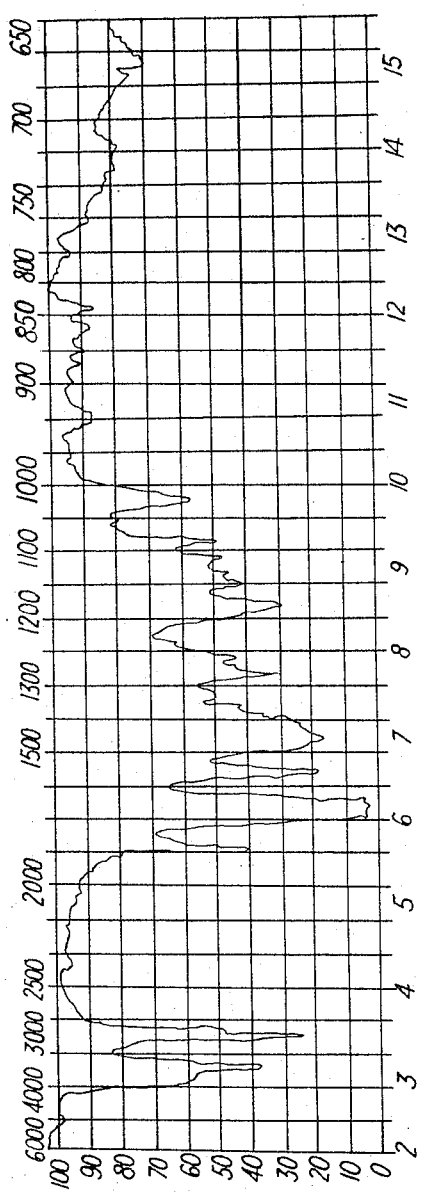
Denise Mancy
Leon Ninet
Jean Preud'homme
*Inventors*
*By*
Stevens, Davis, Miller & Mosher *Attorneys*

United States Patent Office 3,365,362
Patented Jan. 23, 1968

3,365,362
ANTIBIOTIC FOR TREATING TUBERCULOSIS AND METHOD OF PRODUCING SAME
Denise Mancy, Charenton, and Leon Ninet and Jean Preud'homme, Paris, France, assignors to Rhone-Poulenc S.A., Paris, France, a corporation of France
Filed June 6, 1962, Ser. No. 200,364
Claims priority, application France, June 8, 1961, 864,301; Jan. 24, 1962, 885,778
7 Claims. (Cl. 167—65)

This invention relates to a new antibiotic product, hereinafter designated 11072 RP. This new product is particularly active against mycobacteria and several other Gram-positive micro-organisms. It possesses the same activity against mycobacteria which are resistant to other antibiotics, such as streptomycin, neomycin and kanamycin, as it does against mycobacteria sensitive to these antibiotics.

According to a first feature of the present invention, therefore, there is provided the new antibiotic product 11072 RP having the properties and characteristics hereinafter set forth. The new antibiotic product is produced by the culture, under artificial conditions, of micro-organisms hereinafter identified more completely and belonging to the genus Streptomyces.

Crystalline 11072 RP is soluble in methanol, ethanol, acetone, chloroform, methylene chloride, ethyl acetate, dioxan, pyridine, dimethylformamide and diethyl ether; it is slightly soluble in water and diisopropylether and insoluble in petroleum ether. It is distinguished by the possession of a high degree of solubility in numerous organic solvents. In particular, the partition coefficient of the antibiotic 11072 RP between the water-immiscible organic solvents butanol, ethyl acetate and dichloroethane and the culture filtrate (aqueous phase) is always above 20.

Antibiotic 11072 RP gives negative results in the following reactions: biuret reaction, Sakaguchi reaction, ninhydrin reaction, Molisch reaction, Tollens reaction, Ehrlich reaction, and reaction with 2,4-dinitrophenylhydrazine. It gives positive results in the following reactions: ninhydrin reaction after acid hydrolysis, reaction with potassium permanganate, reaction with Fehling's solution, Seliwanoff reaction and Dische reaction. These tests show that antibiotic 11072 RP contains aminoacids and osidic groups but not aromatic rings. The aminoacids present in the molecule of the new antibiotic have been examined by paper-chromatography after hydrolysis for 24 hours in 6 N hydrochloric acid and glycine, proline, leucine and isoleucine have been specifically identified.

Antibiotic 11072 RP contains carbon, hydrogen, oxygen and nitrogen. Its elementary composition is as follows:

| | Percent |
|---|---|
| C | 61.85–61.90 |
| H | 8.9–8.95 |
| O | 16.7–17.0 |
| N | 12.25–12.35 |

Functional analysis

| | Percent |
|---|---|
| —O—CH$_3$ | 1.25 |
| —CO—CH$_3$ | 5.10 |
| —CH$_3$ (attached to carbon) | 24.45 |
| —CH$_3$ (attached to nitrogen) | 13.30 |

Its physical properties are as follows:
Appearance.—White microcrystalline powder.
Melting point.—222–223° C.
Optical rotation.—$[\alpha]_D^{20} = -100° \pm 5°$ (C=1, methanol).

Ultra-violet spectrum (determined on solutions containing 10 μg./cc. and 100 μg./cc. in methanol).—Weak absorption at low wavelengths; no maximum absorption between 200 and 400 mμ.

Infra-red spectrum (determined on tablets of mixtures with KBr).—This spectrum is represented by the accompanying drawing in which one part of the abscissae represent wavelengths expressed in microns (lower scale) and the other the wave numbers in cm.$^{-1}$ (upper scale), and the ordinates represent percentage transmissions.

Table I lists the principal infra-red absorption bands of the product.

Table I

| | |
|---|---|
| 3330 strong | 1178 strong |
| 2975 strong | 1141 medium |
| 2905 weak | 1126 medium |
| 1782 strong | 1102 medium |
| 1666 very strong | 1079 strong |
| 1640 very strong | 1051 weak |
| 1620 very strong | 1022 medium |
| 1535 strong | 926 medium |
| 1472 medium | 891 very weak |
| 1449 strong | 876 very weak |
| 1414 medium | 862 weak |
| 1388 medium | 843 medium |
| 1371 medium | 828 medium |
| 1350 medium | 782 weak |
| 1302 strong | 760 weak |
| 1283 medium | 724 weak |
| 1270 medium | 711 medium |
| 1238 weak | 663 medium |
| 1197 shoulder | |

The antibiotic 11072 RP can be identified by paper chromatography; the antiobiotic is chromatographed on Arches No. 302 paper by descending development with various solvents or solvent mixtures. The chromatograms are developed by bioautography on nutritive agar plates seed with Mycobacterium 607 or Sarcina lutea. The Rf values obtained are given in Table II:

Table II

| Development solvents: | Rf obtained |
|---|---|
| Light phase of benzene+n-butanol+water mixture (75:25:25 by volume) | 1.0 |
| Light phase of benzene+n-butanol+water mixture (25:75:25 by volume) | 1.0 |
| Light phase of benzene+ethylacetate+water mixture— | |
| 95:5:25 by volume | 0.20 |
| 87:13:25 by volume | 0.45 |
| 85:15:25 by volume | 0.60 |
| Light phase of benzene+chloroform+water mixture— | |
| 80:20:25 by volume | 0.20 |
| 75:25:25 by volume | 0.30 |
| 65:25:25 by volume | 0.40 |
| 25:75:25 by volume | 1.0 |
| Distilled water | 0.60 |
| n-Propanol+water— | |
| 5:95 by volume | 0.70 |
| 15:85 by volume | 0.80 |
| 25:75 by volume | 0.90 |
| 75:25 by volume | 1.0 |

These chromatographic results show that antibiotic 11072 RP consists of a single active substance. The bacteriostatic activity of antibiotic 11072 RP relative to a certain number of microorganisms has been determined by one of the dilution methods currently used for this purpose. For each microorganism, the lowest concentration of the substance is found which prevents all visible development in an appropriate nutritive broth. The results of various determinations are collected together in the Table III below, in which the minimal bacteriostatic concentrations are expressed in micrograms of substance per cc. of test medium.

*Table III.—Antibiotic spectrum*

| Bacterial strain tested: | Bacteriostatic concentration in μg./cc. |
|---|---|
| *Mycobacterium tuberculosis* var. *hominis* strain H37 Rv | 1–5 |
| *Mycobacterium tuberculosis* strain Vy (bovine strain) | 0.5–1 |
| Mycobacterium species—ATCC 607 | 0.25–0.50 |
| *Corynebacterium pseudodiphthericum* (Faculte de Pharmacie de Paris) | 0.02 |
| *Neisseria catarrhalis* (Faculte de Pharmacie de Paris) | 0.26 |
| *Sarcina lutea*—ATCC 9341 | 0.36 |
| *Micrococcus citreus*—ATCC 8411 | 6.9 |
| *Micrococcus lysodeikticus*—ATCC 4698 | 0.46 |
| *Staphylococcus aureus* strain 209P–ATCC 6538P | >250 |
| *Streptococcus faecalis*—ATCC 9790 | >250 |
| *Streptococcus viridans* (Institut Pasteur, Paris) | >250 |
| *Streptococcus pyogenes hemolyticus* (strain Dig 7—Institut Pasteur, Paris) | >250 |
| *Diplococcus pneumoniae* (strain Til—Institut Pasteur, Paris) | >250 |
| *Bacillus subtillus*—ATC 6633 | >250 |
| *Bacillus megatherium*—NRRL-B-938 | >250 |
| *Bacillus cereus*—ATCC 6630 | >250 |
| *Bacillus brevis*—ATCC 8185 | >250 |
| *Escherichia coli*—ATCC 9637 | >250 |
| *Aerobacter aerogenes*—ATCC 8308 | >250 |
| *Alcaligenes faecalis*—ATCC 8749 | >250 |
| *Proteus vulgaris* (Faculte de Pharmacie de Paris) | >250 |
| *Klebsiella pneumoniae*—ATCC 10031 | >250 |
| *Pseudomonas aeruginosa*—Bass strain, Institut Pasteur, Paris | >250 |

These different determinations show that the activity of the antibiotic 11072 RP is directed principally against the mycobacteria, including virulent strains. In addition it is also active against strains resistant to other antibiotics as well as non-resistant strains, as shown in Table IV.

*Table IV.—Action on Mycobacteria resistant to other antibiotics*

| Bacterial strain: | Bacteriostatic concentration in μg./cc. |
|---|---|
| *Mycobacterium tuberculosis*, strain Vy | 0.5–1 |
| *Mycobacterium tuberculosis*, strain Vy (streptomycin resistant) | 1–5 |
| *Mycobacterium tuberculosis*, strain Vy (neomycin resistant) | 1–5 |
| *Mycobacterium tuberculosis*, strain Vy (viomycin resistant) | 1–5 |
| *Mycobacterium tuberculosis*, strain Vy (kanamycin resistant) | 1–5 |

Finally, antibiotic 11072 RP has also shown itself active against numerous strains isolated from pathological specimens from patients, as shown in Table V.

*Table V.—Action on strains of Mycobacterium tuberculosis isolated from pathological specimens*

| Bacterial strain (identified by a code corresponding to the patient from which is was isolated): | Bacteriostatic concentration in μg./cc. |
|---|---|
| H37 Rv | 0.8–1 |
| Arl. | 1–2 |
| Ve. | 0.8–1 |
| Pa. | 0.8–1 |
| Bat. | 0.4–0.6 |
| Bar. (isoniazid resistant strain) | 1–2 |
| Er. (isoniazid resistant strain) | 1–2 |
| B V (polyresistant strain) | 1–2 |
| Sav. (polyresistant strain) | 2–4 |
| Bid. (bovine strain) | 2–4 |

The in vitro antibiotic activity of antibiotic 11072 RP against mycobacteria has been confirmed in vivo in laboratory animals experimentally infected with microorganisms such as the *Tuberculosis bacillus* (virulent strains Vy and Br). It has been shown, in particular, to be very active in the mouse by subcutaneous and oral administration; in addition, it has been shown to be active on oral administration against tuberculosis in the guinea-pig.

The organisms which produce antibiotic 11072 RP belong to the genus Streptomyces and are designated "*S. caelicus*" and "*S. griseus* 20129." A sample of *S. caelicus* has been desposited at the Northern Regional Research Laboratory at Peoria (Illinois), United States of America, under the registration number NRRL 2957. *S. caelicus* was isolated from a soil fragment taken near Madras in India. The method of isolation was as follows: the soil sample was suspended in sterile distilled water and the suspension diluted to various concentrations. A small volume of each dilution was spread on the surface of Petri dishes containing Emerson's nutritive medium or any other appropriate medium. After incubation for several days at 26° C., the colonies of microorganisms which it was desired to isolate were picked out onto agar slopes to obtain more abundant cultures.

Following the classification of "Bergey's Manual of Determinative Bacteriology" 7th edition (1957) for the genus Streptomyces, no description has been found of species the culture characteristics and biochemical properties of which coincide with those of this Streptomyces. For this reason, this organism may be regarded as a new species, to which has been given the name of "*Streptomyces caelicus*" because of the colour of its aerial spore-bearing body and its ability to form a blue pigment in a certain number of culture media.

The following is a description of its characteristics:

*Streptomyces caelicus* forms spores of oval to cylindrical form with very rounded ends measuring 0.6–0.8 by 0.9–1.2μ, borne on long spore-bearing filaments which roll up into tight spirals of elongated form, which may frequently contain 10 to 15 turns. The sporophores thus formed are carried on aerial hyphae 0.3 to 0.5μ in diameter; their insertion is monopodial. This method of sporulation places *S. caelicus* in the section "Spira" of the classification of the Streptomyces by Pridham [Applied Microbiology, 6, 52–79 (1958)]; it has been observed and found to be identical on the following culture media, recommended for this subject by Pridham: Czapek's synthetic agar, Hickey and Tresners' agar, tomato extract and oatmeal agar, agar with starch and mineral salts, Bennett's agar.

*Streptomyces caelicus* has as particular characteristics on the one hand an aerial, sporulated, blue coloured structure and on the other the abundant formation of a blue pigment of sustained intensity in a certain number of culture media, particularly in certain synthetic media in which it may be particularly observed. Most frequently the pigment commences to be formed from the first days of culture giving a bright blue tint to these media; its production is then so abundant that its accumulation very rapidly gives an extremely dark blue-black colour to the agar. In certain organic media this blue pigment is more or less obscured by a black pigment produced independently.

*Streptomyces caelicus* may be distinguished from all previously described species of Streptomyces which produce blue pigment for the following reasons:

A. *S. caelicus* produces a pigment the coloration of which is susceptible to variation according to the degree of acidity or alkalinity of the medium and turns red in an acid medium, as does the pigment produced by *Streptomyces coelicolor*. If the species described in Bergey's classification (7th edition) are compared with *S. caelicus*, it is *S. coelicolor* (*S. violaceoruber* of Waksman and Curtis) which approaches it most closely on account of this production of pigment. It differs essentially, however, from that species in the following points:

(a) The coloration of the aerial spore-bearing body of *S. caelicus* is a slightly greenish light blue, while that of *S. coelicolor* (*S. violaceoruber*) is grey; comparison of simultaneous cultures of the two species leaves no doubt as to the difference in the coloration of the aerial bodies.

(b) *S. caelicus* forms very long spore-bearing filaments which roll into long, tight spirals frequently containing up to 10 to 15 turns. The appearance of the spore-bearing filaments differs from the appearance of those of *S. coelicolor* (*S. violaceoruber*) which form loose spirals with a more restricted number of turns.

(c) *S. caelicus* in contrast to *S. coelicolor* (*S. violaceoruber*) is a chromogenous strain, producing a blackish pigment in particular on Williams and McCoys' maltose-tryptone agar.

B. A table of the species of Streptomyces producing a blue pigment has ben prepared by Kutzner and Waksman (J. of Bact. 78, 528–538, 1959); among them, only two have blue aerial mycelia: *S. caeruleus* of Baldacci and *S. cyaneus* of Krassilnikov. *S. caeruleus*, not having spiral spore-bearing filaments, does not come in the same classification section as *S. caelicus*. As for *S. cyaneus*, its pigment is of a different nature to the pigment of *S. caelicus*, the colour being insensitive to variations in the pH of the medium.

The culture characteristics and biochemical properties of *Streptomyces caelicus* have been examined in the usual nutritive agars and broths used to examine the appearance of strains of Streptomyces. The observations made are recorded in the following Table VI; unless otherwise indicated, they relate to cultures incubated for 2 to 3 weeks at 26° C. which have reached a good state of development. The majority of the culture media employed were prepared according to the formulae given in "The Actinomycetes" S. A. Waksman, p. 193–197, Chronica Botanica Company, Waltham, Mass., U.S.A., (1950); in this case they are identified by the letter W followed by the number given to them in "The Actinomycetes." The other references are given at the end of Table VI.

Following the method of Pridham and Gottlieb, (J. of Bact., 56, 107–114, 1948), it has been determined that *Streptomyces caelicus* utilises readily, as sources of carbon, the following substances: xylose, arabinose, rhamnose, fructose, glucose, galactose, mannose, lactose, maltose, succrose, trehalose, cellobiose, raffinose, dextrin, starch, glycerine, adonitol, mannitol and inositol. It does not utilise sorbose, erythritol, dulcitol or sorbitol.

As sources of nitrogen, *Streptomyces caelicus* utilises readily the following substances: $(NH_4)_2SO_4$, adenosine, urea, asparagine, glycine, alanine, valine, glutamic acid, arginine, lysine, threonine, phenylalanine, tyrosine, proline, histidine, $NaNO_3$, $NaNO_2$, sarcosine and hydroxyproline. The following are moderately well-utilised: adenine, uracil and acetamide. The following are not utilised: methionine, creatine, creatinine and taurine Table VI

| Culture Medium | Degree of Development | Vegetative Mycelium or Underside of Culture | Aerial Body (comprising both the aerial mycelium and the sporulation) | Soluble Pigment | Observations and Biochemical Products |
|---|---|---|---|---|---|
| Bennett's Agar (Ref. A). | Good | Underside black | Well developed. Greyish-white to light greyish blue-green. Exudation of several bright blue coloured droplets which colour the aerial body in the region in which they appear. | Black | |
| Maltose-Tryptone Agar (Ref. B). | Very good | do | Very well developed. Light greyish blue-green. Exudation of several bright blue coloured droplets which colour the aerial body in the region in they which appear. | do | The strain is chromogenous. An abundant soluble black pigment is seen to appear from the first days of the culture. |
| Emerson's Agar (W-23). | Fairly good | do | Very moderately developed. Whitish to bright blue. | do | |
| Pridham's Yeast Extract Agar (Ref. C). | Very good | do | Very well developed. Light greyish blue-green. | do | |
| Glucose-Peptone Agar (W-7). | Good | Underside black, tinged with blue. | Well developed. Light greyish blue-green. | Dark blue-black | |
| Nutritive Agar (W-5). | Moderate | Well developed blue-black. | None | Blue-black, slightly greenish. | |
| Glycerine Asparagine Agar (W-3). | do | Moderate development very dark violet. | do | Dark violet | |
| Krainsky's Calcium Malate Agar (Ref. E). | Good | Underside dark blue. | Well developed. Light greyish blue-green. | Blue | Solubilisation of the calcium malate. |
| Tyrosine Agar | Moderate | Very dark blue-black. | Traces. Grey-blue to pure blue. | Dark blue-black | No visible solubilisation of the tyrosine. |
| Starch Agar (W-10) | Fairly good | Underside blue | Development moderate. Greyish to pure blue. | Bright blue of sustained intensity. | Hydrolysis of starch is weak and slow. |
| Culture on Potato (W-27). | Fairly good | | Very small. Limited to the top of the piece of potato. | Brown-black with or without addition of blue-black. | Blackish-brown vegetative mycelium and brown-black soluble pigment from the start of culture. Then more or less evenly and more or less slowly blue-black pigment appears which colours the vegetative mycelium and diffuses into the potato. |
| Glucose-Asparagine Agar (W-2). | do | Underside dark violet. | Very moderate development. Pink to light greyish blue-green. | Dark violet | |

Table VI

| Culture Medium | Degree of Development | Vegetative Mycelium or Underside of Culture | Aerial Body (comprising both the aerial mycelium and the sporulation) | Soluble Pigment | Observations and Biochemical Products |
|---|---|---|---|---|---|
| Czapek's Synthetic Agar with Sucrose (W-1). | Good | Underside black, tinged with blue. | Well developed. Blue-grey to pure blue. Exudation of several bright blue coloured droplets which colour the aerial body in the region in which they appear. | Blue-black | |
| 12% Pure Gelatin (Ref. D). | Fairly good | Culture blue-black from surface to underside. | Moderate development. Light greyish blue. | Blue-black to dark violet-tinged brown, developing from the surface. | Complete liquefaction fairly rapid. |
| Czapek's Synthetic Broth with Sucrose (W-18). | do | Underside of pellicle yellowish. | Whitish to light blue | Violet-tinged | Production of nitrites from nitrates: Weakly positive at commencement of culture, fairly rapidly becoming negative. |

Ref. A—Jones, K. L.—Journal of Bacteriology 57, 142, 1949.
Ref. B—Williams, A. M. and McCoy, E.—Applied Microbiology 1, 307, 1953.
Ref. C—Pridham, T. G. et al.—Antibiotics Annual, 1956-7, p. 947.
Ref. D—'Plain gelatine'—prepared by the instructions given in "Manual of methods for Pure Culture Study of Bacteria" by the Society of American Bacteriologists (II 50-18).
Ref. E—Grundy et al.—Antibiotics and Chemotherapy 2, 401 (1952)

A sample of *Streptomyces griseus* 20129, the alternative source of the antibiotic of the present invention, has been deposited at the Northern Regional Research Laboratory at Peoria (Illinois) United States of America, under the Registration No. NRRL 2986. The organism was isolated from a soil sample obtained in Brazil. The method of isolation was the same as that indicated for *S. caelicus*. Study of this new strain has shown that it possesses morphological characteristics which relate it to the species *Streptomyces griseus* of Waksman and Henrici as defined in "Bergey's Manual of Determinative Bacteriology," 7th Edition, 1957; it does not in effect differ from the latter other than in a few particulars which only allow it to be distinguished as a particular variety.

*Streptomyces griseus* 20129 forms on all its culture media a yellowish grey vegetative mycelium often tinged with greenish grey or greenish grey-brown, particularly upon organic media. Its aerial body, which is abundant and and powdery in appearance, is very light yellow-grey in colour, often turning to greenish. It produces spherical to oval spores, measuring 0.7 to 1.0$\mu$ by 0.8 to 1.3$\mu$. These spores are borne on filaments which are straight or slightly wavy, never rolling into spirals. The points differentiating it from the species *Streptomyces griseus* described in Bergey's Manual are the following:

(a) Production of greenish grey to greenish brown pigment colouring more or less all, or only certain parts, of the vegetative mycelium of cultures on agar with glucose or on skimmed milk;

(b) Culture on potato gives rise to the formation of a greyish brown or blackish-brown to olive brown coloration which colours the potato;

(c) Contrary to the strain described by Waksman and Henrici, *Steptomyces griseus* 20129 does not reduce nitrates to nitrites.

Following the method of Pridham and Gottlieb (J. of Bact. 56, 107–114, 1948), it has been established that *Streptomyces griseus* 20129 utilises the following substances as sources of carbon: xylose, arabinose, glucose, galactose, fructose, mannose, maltose, trehalose, cellobiose, dextrin, starch, glycogen, glycerin, adonitol, and mannitol. Rhamnose, fucose, sorbose, sucrose, raffinose, inulin, erythritol, dulcitol, sorbitol and inositol are not utilised. Lactose is moderately utilised, producing only a slow and incomplete growth of the Streptomyces.

As nitrogen sources, *Streptomyces griseus* 20129 utilises the following substances: $(NH_4)_2SO_4$, adenine, adenosine, urea, asparagine, glycine, alanine, valine, glutamic acid, arginine, lysine, threonine, methionine, phenylalanine, tyrosine, proline and histidine. Sodium nitrate, sodium nitrite, uracil, acetamide, creatine, creatinine, taurine, sarcosine and hydroxyproline are not utilised.

According to a further feature of the invention there is provided a process for the preparation of the antibiotic 11072 RP which comprises cultivating *Streptomyces caelicus* or *S. griseus* 20129 or their productive mutants on a nutrient medium and separating the antibiotic formed during the course of the culture.

The culture can be carried out by all methods of surface or submerged aerobic culture, but the latter is to be preferred for reasons of convenience. For this purpose, the various types of apparatus which are now in current usage in the fermentation industry may be used.

In particular, the following sequence of operations may be adopted:

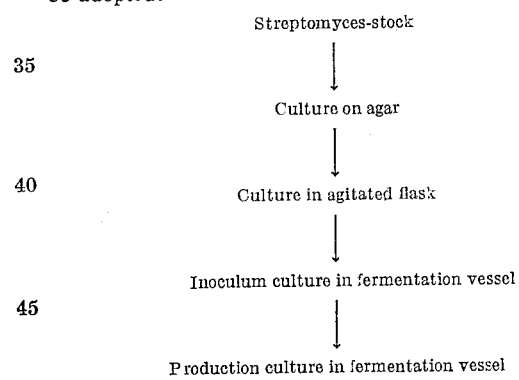

Streptomyces-stock
↓
Culture on agar
↓
Culture in agitated flask
↓
Inoculum culture in fermentation vessel
↓
Production culture in fermentation vessel The fermentation medium should contain essentially an assimilable source of carbon and an assimilable source of nitrogen, inorganic salts and, if desired, growth-promoting agents. All these elements may be included in the form of well-defined substances or as complex mixtures such as are found in biological substances of diverse origins.

As assimilable sources of carbon, carbohydrates such as glucose, dextrins or starch or other carbon, hydrogen and oxygen-containing substances such as the sugar alcohols, e.g. glycerol and mannitol, or certain organic acids, e.g. lactic acid, citric acid and tartaric acid, may be used. Certain animal or vegetable oils such as lard and soya oil may, with advantage, replace these carious carbon, hydrogen and oxygen-containing substances or be added to them.

Convenient sources of assimilable nitrogen are extremely varied. They may be very simple chemical substances such as nitrates, inorganic and organic ammonium salts, urea and amino acids. They may also be supplied by complex substances containing nitrogen principally in the form of protein, e.g. casein, lactalbumin, and gluten and their hydrolysates, soya, peanut and fish meal, meat extracts, yeast extracts, "Distillers' solubles" and "corn-steep."

Among the inorganic substances added, certain may have a buffering or neutralising effect such as alkali metal and alkaline earth metal phosphates or calcium and magnesium carbonates. Others contribute to the ionic equilibrium necessary to the development of Streptomyces and the formation of the antibiotic, such as alkali metal and alkaline earth metal chlorides and sulphates. In addition, certain of them act more specially as activators of the metabolic reactions of Streptomyces; these are the salts of zinc, cobalt, iron, copper and manganese.

The pH of the fermentation medium at the beginning of the culture should be between 6.0 and 7.8, preferably 6.5 to 7. The optimal temperature for the fermentation is 25–27° C. but a satisfactory production is obtained at temperatures between 23 and 35° C. The aeration of the fermentation may be varied between fairly wide limits. It has, nevertheless, been found that aeration rates of 0.3 to 2 litres of air per litre of broth per minute give particularly good results. The maximal yield of antibiotic is obtained after 2 to 5 days of culture, the time depending essentially on the medium used.

From the foregoing statements, it will be seen that the general conditions for the culture of Streptomyces for the production of antibiotic 11072 RP may be varied widely and be adapted to each particular circumstance.

The antibiotic 11072 RP can be isolated from the fermentation media by different methods. The fermentation medium may be first filtered at a pH between 2 and 9 in the presence of a filtration adjuvant, the activity level in the filtrate being then practically independent of the pH; to render the subsequent treatments more easy it is however preferable, in general, to filter the culture at a pH between 4 and 6.

The antibiotic may then be extracted from the filtrate by means of a water-immiscible aliphatic alcohol containing four or five carbon atoms such as n-butyl alcohol or a mixture of amyl alcohols, an aromatic alcohol such as benzyl alcohol, a ketone such as methylisobutyl ketone, an ester such as ethyl or amyl acetate, or a chlorinated solvent such as chloroform or dichloroethane. This extraction may also be carried out at a pH between 2 and 9 but it is generally preferable to operate at a pH between 2 and 6 to obtain the best conditions for industrial practice. The organic solution containing antibiotic 11072 RP is then concentrated to a small volume. The addition of a poor solvent for 11072 RP, such as hexane or diisopropyl ether, then produces the partial or complete precipitation of the crude antibiotic according to the degree of concentration and the solvents used.

When the precipitation of the crude antibiotic is not complete, the mother-liquors are treated by passage through a column of alumina, preferably, but not essentially, containing about 1 kg. of alumina per litre of solution. After washing the column with a poor solvent for the antibiotic, such as hexane or diisopropyl ether, the antibiotic which remains in the column is eluted with one or more of the good solvents mentioned above, such as methanol, ethanol, chloroform and ethyl acetate. The organic solution containing the antibiotic is then concentrated to a small volume which produces, if desired after the addition of a poor solvent such as diisopropyl ether, the precipitation of the rest of the crude antibiotic required.

The crude antibiotic obtained by the preceding operations is not always directly crystallisable. It is often advantageous to first submit it to a purification which may, under certain conditions, lead directly to the pure crystalline antibiotic. The purification may be carried out by any of the classic methods used, in particular by chromatography on various adsorbent agents or by counter-current distribution. It is particularly advantageous to carry out a chromatography, in chloroform, over alumina. The purified antibiotic may be crystallised or recrystallised by dissolving in a solvent, preferably chloroform, with gentle heating and then cooling to produce crystallisation, or again by dissolving in a large quantity of a poor solvent, preferably diisopropyl ether, and slowly crystallising at ambient temperatures. It should be understood that the various methods described above may be applied successively in a varied order or repeated several times, according to the requirements of production, to obtain antibiotic 11072 RP in a form suitable for the applications envisaged.

The following non-limitative examples show how the invention can be put into practice. In the following, activity was throughout determined by a diffusion method, with *Mycobacterium sp.* ATCC 607 as the sensitive organism, by comparison with a pure crystalline sample of the product as standard. This activity is therefore expressed in micrograms ($\mu$g.) of standard crystalline product per mg. for solid products and in $\mu$g. of standard crystalline product per cc. for solutions.

EXAMPLE I

A 170 litre fermentation vessel is charged with:

| | Kg. |
|---|---|
| Corn-steep (50% dry extract) | 2.400 |
| Sucrose | 3.600 |
| Calcium carbonate | 0.900 |
| Ammonium sulphate | 0.240 |

Water to make 100 litres.

This culture medium has a pH of about 6. It is sterilised by the passage of steam at 122° C. for 40 minutes. After sterilisation and cooling to 27° C., the final volume of the broth is 120 litres and the pH 6.85. The medium is then seeded with 200 cc. of a culture in an agitated Erlenmeyer flask of the strain *Streptomyces caelicus*.

The culture in the fermentation vessel is aerated with sterile air at a rate of 5 m.³/hour and stirred with a helix turning at 350 r.p.m. The temperature is maintained at 26–27° C. The pH of the medium remains approximately at its starting value throughout the culture. Development of the fungus begins at about the 20th hour. The culture is suitable for seeding the production culture 48 hours after seeding.

The production culture is carried out in an 800 litre fermentation vessel charged with the following:

| | Kg. |
|---|---|
| Soya meal | 16 |
| Distillers' solubles | 2 |
| Maize starch | 6 |
| Soya oil | 6 |
| Sodium chloride | 4 |

Water to make 350 litres.

The pH of the medium thus obtained is adjusted to 7.6 with concentrated sodium hydroxide solution (400 cc.). The medium is sterilised by the passage of steam at 122° C. for 40 minutes and after sterilisation is cooled to 26–27° C. The volume of the broth is 400 litres and the pH about 6.5. The medium is then seeded with 40 litres of the previous culture in the 170 litre fermentation vessel, stirred with a helix turning at 205 r.p.m., aerated with 15 m.³/hour of sterile air and maintained at 26–27° C. The pH falls slowly from 6.5 to 5.95 over 24 hours and then rises to 8.35 after culture for 90 hours. The production of the antibiotic commences at about the fortieth hour. The fermentation is stopped after 90 hours when the quantity of antibiotic present in the medium is 410 $\mu$g./cc.

EXAMPLE II

The fermentation broth (170 litres) obtained in Example I (titre 410 $\mu$g./cc.) is placed in a vessel fitted with a stirrer and stirred for 1 hour while the pH is adjusted to 5 with 5 N hydrochloric acid. A filtration adjuvant (10 kg.) is added, the mixture filtered on a filter-press and the cake washed with water (70 litres). The filtrate (205 litres) is adjusted to pH 3 with 5 N hydrochloric acid and extracted twice with ethyl acetate (60 and 40 litres). The organic extracts are combined and concentrated under reduced pressure to 1 litre. The concentrate is treated with hexane (10 litres) and the precipitate thus obtained is separated, washed and dried, giving a crude product (86 g.) having an activity of 488 µg./mg.

The mother-liquors are passed through an alumina column which is then washed with hexane. The product remaining in the column is then eluted with methanol. The methanol solution obtained is concentrated under reduced pressure and a second crop of the crude product (9 g.) of activity 415 µg./mg. is obtained.

EXAMPLE III

The crude product (50 g.) isolated in Example II (titre=488 µg./mg.) is dissolved in chloroform (500 cc.). The solution obtained is filtered and then passed through an alumina column (1 kg.). The antibiotic is then eluted with chloroform (2.5 litres), the impurities remaining attached to the alumina. The chloroform solution obtained is concentrated to dryness in vacuo, giving a purified product (29.5 g.) having an activity of 781 µg./mg. This product (25 g.) is dissolved in diisopropyl ether (1.25 litres) at ambient temperature and the solution obtained is stirred for 15 minutes with decolorising charcoal (5 g.). After filtering, standing to crystallise for 3 days at ambient temperature, separating, washing and drying, a pure product (15.8 g.) is obtained having an activity of 1000 µg./mg.

EXAMPLE IV

A fermentation broth (1000 litres), which is the combined product of several operations carried out as described in Example I having an activity of 390 µg./cc. and a pH of 7.8, is placed in a vessel fitted with a stirrer. This broth is adjusted to pH 5 with hydrochloric acid and stirred for 30 minutes with a filtration adjuvant (45 kg.). The mixture is filtered on a filter-press and the cake washed with water (200 litres). The filtrate (1040 litres) is extracted with dichloroethane (400 litres) after adjusting the pH to 3 with hydrochloric acid. The extract is then concentrated under reduced pressure to 2 litres. The concentrate is then treated with diisopropyl ether (8 litres) and the precipitate obtained is filtered off, washed, and dried, thus giving a crude product (154 g.) having an activity of 456 µg./mg.

The mother-liquor from the precipitation is passed through a column of alumina (8 kg.). The column is washed with hexane (4 litres) and the product remaining in the column is eluted with chloroform (30 litres). The chloroform solution thus obtained is concentrated under reduced pressure to 500 cc. and cooled to +5° C. which induces the commencement of a crystallisation. Diisopropyl ether (500 cc.) is then added to complete the crystallisation. The crystals are separated, washed and dried giving a purified product (192 g.) having an activity of 960 µg./mg. After recrystallisation from diisopropyl ether as described at the end of Example III, a pure product (168 g.) is obtained having an activity of 1000 µg./mg.

EXAMPLE V

The crude product of Example IV of activity 456 µg./mg. (100 g.) is dissolved in chloroform (1 litre). The solution is passed through an alumina column (1 kg.) and the antibiotic then eluted with chloroform (2 litres). The chloroform solution obtained is concentrated under reduced pressure to the point of crystallisation. The crystals are then filtered-off, washed and dried giving a pure product (62 g.) having an activity of 1000 µg./mg.

EXAMPLE VI

A 170 litre fermentation vessel is charged with the following:

| | Kg. |
|---|---|
| Peptone | 1.200 |
| Meat extract | 0.600 |
| Hydrated glucose | 1.200 |
| Water to make 100 litres. | |

The pH of the medium thus obtained is adjusted to 6.95 with concentrated sodium hydroxide solution (110 cc.). The medium is sterilised by the passage of steam at 122° C. for 40 minutes. After cooling to 26–27° C. the final volume of the broth is 120 litres and the pH 6.60. The medium is then seeded with 200 cc. of culture of the strain *Streptomyces griseus* 20129 in an agitated Erlenmeyer flask. The culture in the fermentation vessel is aerated with sterile air at a rate of 5 m.³/hour, stirred with a helix turning at 250 r.p.m., and kept at a temperature of 26° C.

The pH of the medium is between 6.40 and 6.60 for the first sixteen hours and then rises to reach 7.50 after 24 hours of culture. The development of the fungus commences at about the 20th hour and the culture is suitable for seeding the production culture 27 hours after seeding.

The production culture is carried out in an 800 litre vessel containing:

| | | |
|---|---|---|
| Soya meal | kg. | 16 |
| Distillers' solubles | kg. | 4 |
| Starch | kg. | 6 |
| Soya oil | kg. | 6 |
| Calcium carbonate | kg. | 4 |
| Sodium chloride | kg. | 2 |
| Cobalt chloride 6H₂O | g. | 8 |
| Water to make 370 litres. | | |

The medium thus obtained, of pH 6.45, is sterilised by the passage of steam at 122° C. for 40 minutes. After cooling to 26–27° C. the volume of the broth is 400 litres and the pH 6.55. The medium is then seeded with 40 litres of the preceding culture in the 170 litre fermentation vessel and the medium stirred with a helix turning at 220 r.p.m., aerated with 15 m.³/hour of sterile air and kept at a temperature of 26–27° C.

The pH rises by successive steps to a value of 8.55 with a first step to 7 from 6 to 30 hours, a second step to 7.3 from 43 to 67 hours, and then rises regularly to 8.40 from 78 to 115 hours. Finally, the pH reaches 8.55 after 139 hours and the fermentation is then stopped. Production of the antibiotic commences at about the 67th hour and reaches its maximum at 90 hours. The quantity of antibiotic present in the medium is then 26 µg./cc.

The fermentation broth (380 litres) obtained above is then treated as described in Example II giving a crude product (6.8 g.). This crude product (4.8 g.) is dissolved in chloroform and purified by chromatography over alumina as described in Example III giving a purified product (4 g.) which, after crystallisation from diisopropyl ether as described in the same Example III, gives pure crystalline antibiotic 11072 RP (3 g.), having an activity of 1000 µg./mg.

According to a further feature of the present invention there are provided therapeutic compositions of matter which contain the antibiotic 11072 RP together with a therapeutically acceptable diluent and/or another therapeutically active substance. Such compositions may be prepared in any usual form of therapeutic composition according to the manner in which the product is to be used.

The following example will serve to illustrate this aspect of the invention:

EXAMPLE VII

Unit dose tablets containing 0.5 gram of the antibiotic 11072 RP are prepared, by methods known per se from the following composition:

| | Gram |
|---|---|
| Antibiotic 11072 RP | 0.500 |
| Wheat starch | 0.150 |
| Colloidal silica | 0.040 |
| Magnesium stearate | 0.010 |

In the treatment of tuberculosis the antibiotic 11072 RP is preferably administered orally to a patient suffering from tuberculosis generally in doses of 5 to 15 g. per day.

We claim:

1. The antibiotic product herein designated 11072 RP which in its microcrystalline form has melting point 222–223° C., which possesses an optical rotation $[\alpha]_D^{20}$ of $-100°\pm5°$ (C=1, methanol), which is soluble in methanol, ethanol, acetone, chloroform, methylene chloride, ethyl acetate, dioxan, pyridine, dimethyl formamide and diethyl ether, slightly soluble in water and diisopropyl ether and insoluble in petroleum ether, which has the elemental analysis C=61.85–61.90%, H=8.9–8.95%, O=16.7–17.0% and N=12.25–12.35%, which in its ultraviolet spectrum presents no absorption maximum between 200 and 400 mμ and which has the following principal absorption bands in its infra-red spectrum:

| | |
|---|---|
| 3330 strong | 1178 strong |
| 2975 strong | 1141 medium |
| 2905 weak | 1126 medium |
| 1782 strong | 1102 medium |
| 1666 very strong | 1079 strong |
| 1640 very strong | 1051 weak |
| 1620 very strong | 1022 medium |
| 1535 strong | 926 medium |
| 1472 medium | 891 very weak |
| 1449 strong | 876 very weak |
| 1414 medium | 862 weak |
| 1388 medium | 843 medium |
| 1371 medium | 828 medium |
| 1350 medium | 782 weak |
| 1302 strong | 760 weak |
| 1283 medium | 724 weak |
| 1270 medium | 711 medium |
| 1238 weak | 663 medium |
| 1197 shoulder | |

2. A therapeutic composition comprising in association with a therapeutically acceptable diluent, the antibiotic product herein designated 11072 RP which in its microcrystalline form has melting point 222–223° C., which possesses an optical rotation $(\alpha]_D^{20}$ of $-100°\pm5°$ (C=1, methanol), which is soluble in methanol, ethanol, acetone, chloroform, methylene dichloride, ethyl acetate, dioxan, pyridine, dimethyl formamide and diethyl ether, slightly soluble in water and diisopropyl ether and insoluble in petroleum ether, which has the elemental analysis C=61.85–61.90%, H=8.9–8.95%, O=16.7–17.0% and N=12.25–12.35%, which in its ultraviolet spectrum presents no absorption maximum between 200 and 400 mμ and which has the following principal absorption bands in its infra-red spectrum:

| | |
|---|---|
| 3330 strong | 1178 strong |
| 2975 strong | 1141 medium |
| 2905 weak | 1126 medium |
| 1782 strong | 1102 medium |
| 1666 very strong | 1079 strong |
| 1640 very strong | 1051 weak |
| 1620 very strong | 1022 medium |
| 1535 strong | 926 medium |
| 1472 medium | 891 very weak |
| 1449 strong | 876 very weak |
| 1414 medium | 862 weak |
| 1388 medium | 843 medium |
| 1371 medium | 828 medium |
| 1350 medium | 782 weak |
| 1302 strong | 760 weak |
| 1283 medium | 724 weak |
| 1270 medium | 711 medium |
| 1238 weak | 663 medium |
| 1197 shoulder | |

3. A process for the therapeutic treatment of tuberculosis which comprises administering orally to a patient suffering from tuberculosis doses of 5 to 15 g. per day of the antibiotic product herein designated 11072 RP which in its microcrystalline form has melting point 222–223° C., which possesses an optical rotation $[\alpha]_D^{20}$ of $-100°\pm5°$ (C=1, methanol), which is soluble in methanol, ethanol, acetone, chloroform, methylene dichloride, ethyl acetate, dioxan, pyridine, dimethyl formamide and diethyl ether, slightly soluble in water and diisopropyl ether and insoluble in petroleum ether, which has the elemental analysis C=61.85–61.90%, H=8.9–8.95%, O=16.7–17.0% and N=12.25–12.35%, which in its ultraviolet spectrum presents no absorption maximum between 200 and 400 mμ and which has the following principal absorption bands in its infra-red spectrum:

| | |
|---|---|
| 3330 strong | 1178 strong |
| 2975 strong | 1141 medium |
| 2905 weak | 1126 medium |
| 1782 strong | 1102 medium |
| 1666 very strong | 1079 strong |
| 1640 very strong | 1051 weak |
| 1620 very strong | 1022 medium |
| 1535 strong | 926 medium |
| 1472 medium | 891 very weak |
| 1449 strong | 876 very weak |
| 1414 medium | 862 weak |
| 1388 medium | 843 medium |
| 1371 medium | 828 medium |
| 1350 medium | 782 weak |
| 1302 strong | 760 weak |
| 1283 medium | 724 weak |
| 1270 medium | 711 medium |
| 1238 weak | 663 medium |
| 1197 shoulder | |

4. A process for the production of the antibiotic product herein designated 11072 RP which comprises cultivating an organism selected from the group consisting of *s. caelicus, S. griseus* 20129 and their 11072 RP-producing mutants on a nutrient medium under aerobic submerged culture conditions at a pH between 6.0 and 7.8, a temperature of 23–35° C. and aeration at a rate of 0.3 to 2 litres of air per litre of the medium per minute, for a period of 2 to 5 days, and separating the antibiotic product formed during the course of the culture.

5. A process according to claim 4 wherein the culture is effected at a pH between 6.5 and 7.

6. A process according to claim 5 wherein the culture is effected at a temperature of 25–27° C.

7. A process according to claim 4 wherein the antibiotic 11072 RP is separated from the culture medium by extraction with a water immiscible organic solvent.

References Cited

UNITED STATES PATENTS 2,999,048  9/1961  Donovick et al. _____ 167—65

SAM ROSEN, *Primary Examiner.*

JULIAN S. LEVITT, *Examiner.*